United States Patent Office 3,845,208

Patented Oct. 29, 1974

1

3,845,208

METHOD OF INCREASING THE CALIBER OF POULTRY EGGS

Jean Andre Grandadam, Saint-Maur des Fosses, France, assignor to Roussel-UCLAF, Paris, France No Drawing. Filed Jan. 12, 1973, Ser. No. 323,123
Claims priority, application France, Jan. 20, 1972, 7201911
Int. Cl. A23k *1/18, 1/165*
U.S. Cl. 424—243 4 Claims

ABSTRACT OF THE DISCLOSURE

Novel poultry feed composition containing poultry feed and at least one compound of the formula

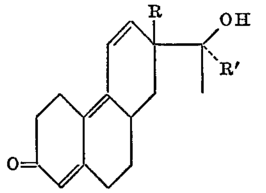

I wherein R is lower alkyl of 1 to 6 carbon atoms and R′ is selected from the group consisting of unsaturated hydrocarbon of 2 to 4 carbon atoms optionally substituted with halogen and cycloalkyl of 3 to 5 carbon atoms and to a novel method of increasing the caliber of eggs laid by chickens so that larger eggs are laid sooner.

OBJECTS OF THE INVENTION

It is an object of the invention to provide novel poultry feeds containing at least one compound of formula I.

It is another object of the invention to increase the size of eggs laid by hens by administering thereto at least one compound of formula I These and other objects and advantages of the invention will become obvious from the following detailed description.

THE INVENTION

The novel poultry feed of the invention is comprised of nutritive substances and an effective amount of at least one compound of the formula

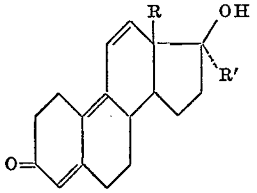

I wherein R is lower alkyl of 1 to 6 carbon atoms and R′ is selected from the group consisting of unsaturated hydrocarbon of 2 to 4 carbon atoms optionally substituted with halogen and cycloalkyl of 3 to 5 carbon atoms.

Among the preferred compounds of formula I are those wherein R is methyl or ethyl and R′ is alkenyl such as allyl, 2-methylallyl, 2-butenyl or trifluorovinyl; alkynyl such as ethynyl, propargyl, propynyl, butadiynyl or chloroethynyl; and cycloalkyl such as cyclopropyl. The most preferred additives are 17α-ethynyl-$\Delta^{4,9,11}$-estratriene-17β-ol-3-one and 17-methallyl-$\Delta^{4,9,11}$-estratriene-17β-ol-3-one.

The poultry feeds in addition to the nutritive substances and the compounds of formula I may optionally contain inert vehicles and/or other inert substances which are harmless to animals. The compounds of formula I are usually 0.01 to 1 part per million by weight of the total composition, 0.05 to 0.5 p.p.m. to obtain optimum action.

2

The compositions of the invention may also be in the form of a concentrate for addition to poultry feeds before use consisting of 1 to 1000 p.p.m. by weight of a compound of formula I and a nontoxic, optionally nutritive excipient.

The poultry feeds and concentrates of the invention have an unexpected and unobvious effect on the quality and quantity of egg laying. In chickens in particular, the addition of the concentrate to their feed results in more rapid laying of a larger number of eggs with harder shells. Generally, egg laying in hens appears starting at the 22nd week and lasts about a year. At the beginning of laying, the eggs are principally of an inferior quality or equal to 45 g. and then the percentage of small eggs diminishes and are replaced by eggs of about 47–48 g., then 52–53 g. in the following weeks to attain an average of 65 g. after 25 weeks of egg laying or after they are 47 weeks old.

By incorporating at least one compound of formula I into a poultry feed, eggs of more elevated caliber are obtained much more rapidly and use with the feed permits the obtention of eggs greater than 50 g. in the 24th week, then a higher percentage of eggs of 57–58 g. in the following weeks. While normally hens 31 weeks old lay eggs of 52–53 g. and 57–58 g. in relatively equal quantities, hens fed with alimentary compositions containing the concentrate with a compound of formula I lay eggs weighing 57–58 g. and larger. Finally, very large eggs (67–68 g. and more) appear sooner and generally beginning the 34th week with the breeding food of the alimentary compositions containing the compounds of formula I.

The additions of the compounds of formula I to the poultry feed also has the effect of significantly augmenting the laying period by the number of eggs laid in a laying period. The augmentation effect is seen also in the hardness of the egg shell with reduced spontaneous breaking of the eggs. Normally in breeding, the percentage of loss by breakage is about 2.5 to 5% which is diminished in significant proportions with the alimentary fed compositions of the invention.

The increase in the weight of the eggs, the increase in the yield of the laying period and the much greater hardness of the egg shells are very important advantages in the poultry industry.

The concentrate of the invention containing at least one compound of formula I can be incorporated into alimentary compositions for fowl by either simple mixing or by first diluting with a powder, placing in suspension in an aqueous vehicle or in emulsion or solution or also in a premixture (concentrate for feed) which preparations can be incorporated into the ordinary feed or the drinking water of the farm yard animals.

As a practical method, a compound of formula I is mixed with an inert excipient and then the product is diluted with 10 to 100 parts of an alimentary composition containing for example carbohydrates, cellulose, proteins, soya, flour, cotton seed flour, flax flour, gelatin, carboxymethylcellulose, kaolin, talc and bentonites. Also, the mixture may be obtained as suspensions or emulsions or by grinding a concentrate containing at least one compound of formula I with an inert liquid excipent, pulverulent or pasty. In addition, the alimentary mixtures can be dispersed in water or an edible oil in the presence of a dispersing agent such as mono-oleate of sorbitan.

It is also possible to add to the alimentary compositions containing the concentrate other additions such as mineral salts, trace elements, vitamins, antioxidants, extracts rich in proteins, coccidiostatics or other substances that favorably contribute to animal growth or quality of life of poultry. The alimentary compositions containing the concentrate of the invention are perfectly tolerated by the organs of poultry.

The compositions can be conveniently given to hens, ducks, guinea fowl, turkeys or geese and the feeding does not modify the nature, the quality or flavor of the meat of the animals. It also does not modify the flavor, odor or coloration of the laid eggs.

The compounds of formula I may be prepared by the process described in French Pat. Nos. 1,453,214, 1,514,-086 and 2,036,820 as well as French BSM Pat. Nos. 7094M, 6830M and 7875M.

The novel method of the invention of increasing the caliber of eggs laid by poultry comprises feeding poultry a composition containing an effective amount of at least one compound of formula I.

In the following examples there are described several preferred embodiments to illustrate the invention but it should be understood that the invention is not intended to be limited to the specific embodiments.

EXAMPLE 1

Alimentary composition 0.005 g. of 17α-ethynyl-$\Delta^{4,9,11}$-estratriene-17β-ol-3-one were incorporated with mixing into 1 kg. of soya flour to obtain a concentrate containing 5 p.p.m. of said steroid. The concentrate was then admixed with 99 kg. of an alimentary composition consisting of wheat flour, soya cake, mineral salts and a vitamin concentrate titrating 800,000 UI of vitamin A per 100 kg. and 25,000 UI of vitamin D per 100 kg. The final alimentary composition contained 0.05 p.p.m. of the said active steroid.

EXAMPLE 2

A concentrate prepared by mixing 0.02 g. of 17α-ethynyl-$\Delta^{4,9,11}$-estratriene-17β-ol-3-one with 1 kg. of soya flour (20 p.p.m. of active steroid) was diluted with 99 kg. of a commercial alimentary mixture to obtain a final alimentary mixture containing 0.2 p.p.m. of the active steroid.

A concentrate containing 17α-methallyl-$\Delta^{4,9,11}$-estratriene 17β-ol-3-one may be obtained in a same manner as defined in Examples 1 and 2.

EXAMPLE 3

Alimentary compositions containing 0.05, 0.1 and 0.2 p.p.m. of 17α-ethynyl - $\Delta^{4,9,11}$ - estratriene - 17β - of-3-one were fed to groups of hens 24 weeks old for 37 weeks and the average weight of the eggs was determined for each week. The results are reported in Table I.

EXAMPLE 4

Using the procedure of Example 3, hens were fed an alimentary composition containing 17α - methallyl - $\Delta^{4,9,11}$-estratriene - 17β - ol - 3 - one and the results are reported in Table II.

TABLE II

[Average egg weight in grams]

| Laying after weeks | 24 | 25 | 26 | 27 | 28 | 29 | 30 | 31 | 32 | 33 | 34 | 35 | 36 | 37 | 38 | 39 | 40 | 41 |
|---|---|---|---|---|---|---|---|---|---|---|---|---|---|---|---|---|---|---|
| Controls | 48.7 | 50.7 | 51.9 | 53.5 | 56.0 | 57.3 | 56.7 | 57.5 | 58.1 | 59.0 | 58.1 | 59.0 | 60.0 | 59.5 | 61.3 | 61.1 | 61.8 | 63.0 |
| Test product, p.p.m.: | | | | | | | | | | | | | | | | | | |
| 0.1 | 48.8 | 51.1 | 53.5 | 55.7 | 56.8 | 57.9 | 57.4 | 58.0 | 59.5 | 59.5 | 59.7 | 60.7 | 60.9 | 61.5 | 61.8 | 61.8 | 62.1 | 63.0 |
| 0.5 | 42.0 | 44.3 | 48.6 | 50.8 | 52.5 | 52.3 | 53.9 | 54.5 | 56.1 | 56.1 | 56.1 | 56.5 | 58.2 | 58.3 | 58.6 | 59.2 | 59.4 | 60.5 |
| 1 | 47.0 | 49.2 | 52.7 | 54.7 | 55.8 | 57.2 | 57.7 | 58.2 | 59.0 | 59.9 | 60.0 | 60.9 | 61.2 | 61.9 | 62.2 | 62.1 | 63.7 | 63.4 |

| Laying after weeks | 42 | 43 | 44 | 45 | 46 | 47 | 48 | 49 | 50 | 51 | 52 | 53 | 54 | 55 | 56 | 57 | 58 | 59 | 60 |
|---|---|---|---|---|---|---|---|---|---|---|---|---|---|---|---|---|---|---|---|
| Controls | 62.8 | 63.9 | 64.1 | 65.2 | 63.4 | 64.0 | 65.5 | 65.7 | 65.4 | 65.9 | 66.5 | 65.7 | 65.5 | 66.1 | 66.9 | 66.6 | 65.6 | 67.8 | 66.7 |
| Test product, p.p.m.: | | | | | | | | | | | | | | | | | | | |
| 0.1 | 62.4 | 63.8 | 64.4 | 65.2 | 64.3 | 65.7 | 66.0 | 66.2 | 65.6 | 65.8 | 66.1 | 66.1 | 65.8 | 64.7 | 66.5 | 65.3 | 65.5 | 67.4 | 67.1 |
| 0.5 | 60.3 | 60.8 | 61.2 | 60.4 | 61.9 | 61.9 | 62.7 | 64.2 | 63.1 | 62.7 | 61.7 | 64.0 | 61.1 | 62.9 | 64.6 | 63.3 | 63.6 | 64.1 | 64.0 |
| 1 | 64.2 | 64.3 | 64.2 | 65.5 | 66.0 | 65.5 | 66.6 | 66.4 | 66.7 | 66.4 | 67.1 | 67.0 | 64.4 | 66.6 | 67.0 | 66.7 | 66.5 | 66.9 | 66.7 |

EXAMPLE 5

Alimentary compositions containing 17α - ethynyl - $\Delta^{4,9,11}$ - estratriene - 17β - ol - 3 - one were fed to egg laying hens from the 27th week to 59th week and the results are reported in Table III.

TABLE III

| Concentration of product | Control | 0.05 p.p.m. | 0.1 p.p.m. | 0.2 p.p.m. |
|---|---|---|---|---|
| Number of hens | 13 | 9 | 9 | 9 |
| Percent really laying | 76.54 | 79.71 | 78.20 | 81.52 |
| Percent waste (non-commercial eggs) | 4.74 | 3.49 | 1.24 | 3.85 |
| Percent laying (saleable eggs) | 71.80 | 76.22 (+4.42) | 76.96 (+5.16) | 77.67 (+5.87) |
| Average weight of eggs in grams | 60.70 | 62.16 | 60.65 | 61.35 |
| Feed consumption in grams for a saleable egg | 150.72 | 144.29 | 144.84 | 140.71 |
| Percent feed economy per egg | | (4.26) | (3.90) | (6.64) |
| Feed consumption in grams per gram of eggs | 2.48 | 2.32 | 2.39 | 2.29 |

EXAMPLE 6

The test of Example 5 was repeated with 17α-methallyl-$\Delta^{4,9,11}$ - estratriene - 17β - ol - 3 - one from the 27th week to 42nd week and the results are reported in Table IV.

TABLE IV

| Concentration of product | Control | 0.1 p.p.m. | 0.5 p.p.m. | 1 p.p.m. |
|---|---|---|---|---|
| Number of hens | 12 | 9 | 9 | 8 |
| Percent really laying | 85.94 | 88.19 | 89.28 | 85.49 |
| Percent waste (non-commercial eggs) | 2.38 | 2.08 | 3.87 | 1.34 |
| Percent laying (saleable eggs) | 83.56 | 86.11 | 85.42 | 84.15 |
| Average weight of eggs in grams | 58.96 | 59.82 | 56.32 | 59.30 |
| Feed consumption in grams for a saleable egg | 133.04 | 131.27 | 126.02 | 130.26 |
| Percent feed economy per egg | | (1.33) | (5.28) | (2.09) |
| Feed consumption in grams per gram of egg | 2.26 | 2.19 | 2.24 | 2.20 |

Various modifications of the compositions and method of the invention may be made without departing from the spirit or scope thereof and it is to be understood that the claims are to be limited only as defined in the appended claims.

TABLE I

[Average egg weight in grams]

| Weeks | 24 | 25 | 26 | 27 | 28 | 29 | 30 | 31 | 32 | 33 | 34 | 35 | 36 | 37 | 38 | 39 | 40 | 41 |
|---|---|---|---|---|---|---|---|---|---|---|---|---|---|---|---|---|---|---|
| Controls | 45.5 | 50.9 | 50.5 | 52.8 | 53.3 | 54.6 | 54.9 | 55.7 | 56.9 | 57.1 | 57.5 | 58.8 | 59.9 | 59.9 | 60.7 | 60.5 | 61.2 | 61.2 |
| Test product, p.p.m.: | | | | | | | | | | | | | | | | | | |
| 0.05 | 48.3 | 49.7 | 51.7 | 53.8 | 55.0 | 56.6 | 57.2 | 57.6 | 59.2 | 59.8 | 58.5 | 59.2 | 60.6 | 60.4 | 61.3 | 61.8 | 62.3 | 62.9 |
| 0.1 | 46.5 | 49.4 | 50.8 | 55.0 | 53.5 | 55.2 | 56.2 | 56.6 | 57.9 | 57.8 | 57.7 | 59.8 | 58.8 | 59.1 | 60.7 | 60.4 | 60.9 | 61.8 |
| 0.2 | 48.8 | 51.8 | 52.6 | 54.7 | 56.4 | 57.1 | 57.4 | 57.2 | 58.4 | 58.6 | 58.6 | 59.5 | 59.8 | 60.0 | 60.5 | 60.2 | 61.8 | 61.8 |

| Weeks | 42 | 43 | 44 | 45 | 46 | 47 | 48 | 49 | 50 | 51 | 52 | 53 | 54 | 55 | 56 | 57 | 58 | 59 | 60 |
|---|---|---|---|---|---|---|---|---|---|---|---|---|---|---|---|---|---|---|---|
| Controls | 59.6 | 62.4 | 62.7 | 62.4 | 63.2 | 63.1 | 63.5 | 64.2 | 63.9 | 64.7 | 64.8 | 65.3 | 64.0 | 65.3 | 66.7 | 66.6 | 64.9 | 65.9 | 66.5 |
| Test product, p.p.m.: | | | | | | | | | | | | | | | | | | | |
| 0.05 | 62.9 | 64.5 | 63.6 | 64.5 | 65.5 | 65.3 | 65.6 | 66.8 | 66.2 | 66.4 | 65.9 | 66.9 | 66.3 | 66.3 | 67.3 | 66.6 | 66.0 | 66.1 | 66.1 |
| 0.1 | 61.4 | 61.1 | 62.1 | 62.6 | 63.4 | 63.9 | 63.7 | 65.6 | 64.6 | 63.4 | 63.7 | 63.6 | 62.0 | 64.5 | 65.1 | 64.4 | 65.6 | 65.5 | 65.6 |
| 0.2 | 61.5 | 62.3 | 62.5 | 63.3 | 63.9 | 63.6 | 64.2 | 65.3 | 65.0 | 64.3 | 64.1 | 64.9 | 64.0 | 63.7 | 65.2 | 64.6 | 64.8 | 64.8 | 65.1 |

I claim:

1. A method of increasing the caliber of eggs of poultry comprising orally administering to egg laying poultry an amount effective to increase the caliber of eggs of at least one active compound of the formula

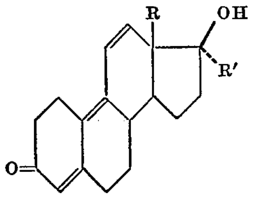

wherein R is lower alkyl of 1 to 6 carbon atoms and R' is selected from the group consisting of allyl, 2-methylallyl, 2-butenyl, trifluorovinyl, ethynyl, propargyl, propynyl chlorethynyl butadiynyl and cyclopropyl.

2. The method of claim 1 wherein the active compound is 17α - ethynyl - $\Delta^{4,9,11}$ - estratriene - 17β - ol - 3 - one.

3. The method of claim 1 wherein the active compound is 17α - methallyl - $\Delta^{4,9,11}$ - estratriene - 17β - ol - 3 - one.

4. The method of claim 1 wherein the active compound is in the poultry feed in an amount of 0.01 to 1 p.p.m. of the total feed.

References Cited

UNITED STATES PATENTS

| | | | |
|---|---|---|---|
| 3,573,284 | 3/1971 | G. Muller et al. | 424—243 |
| 3,691,215 | 9/1972 | L. Nedelec | 424—243 |
| 3,257,278 | 6/1966 | G. Nomine et al. | 424—243 |

FOREIGN PATENTS

| | | | |
|---|---|---|---|
| 5,235,000 | 7/1967 | France | 424—243 |
| 5,183,000 | 6/1967 | France | 424—243 |
| 1,453,214 | 8/1966 | France. | |

NORMAN YUDKOFF, Primary Examiner

C. P. RIBANDO, Assistant Examiner

U.S. Cl. X.R.

426—2, 218, 807